United States Patent [19]

Corbin et al.

[11] Patent Number: 4,869,943

[45] Date of Patent: Sep. 26, 1989

[54] FIBER-REINFORCED SILICON NITRIDE CERAMICS

[75] Inventors: Normand D. Corbin, Northborough; Stephen D. Hartline, Millbury; George A. Rossetti, Jr., Worcester, all of Mass.

[73] Assignee: Norton Company, Worcester, Mass.

[21] Appl. No.: 893,747

[22] Filed: Aug. 6, 1986

Related U.S. Application Data

[63] Continuation-in-part of Ser. No. 692,441, Jan. 17, 1985, abandoned.

[51] Int. Cl.$^4$ .................... C04B 35/56; C04B 35/58; C04B 35/80; B32B 9/00
[52] U.S. Cl. ........................... 428/114; 264/60; 428/212; 428/294; 428/302; 428/332; 428/336; 428/698; 501/92; 501/95; 501/97
[58] Field of Search ..................... 501/92, 95, 97; 428/114, 294, 698, 212, 113, 302, 332, 336; 264/60

[56] References Cited

U.S. PATENT DOCUMENTS 3,914,500 10/1975 Brennan et al. ................ 264/60
4,689,188  8/1987 Bhatt ................................ 264/60
4,781,993 11/1988 Bhatt ............................... 428/698

OTHER PUBLICATIONS

*Exploratory Research on Silicon Nitride Composites,* Fischback et al., Grant #DE-FG-01-78-ET-13389, 9/1/78-1/31/80.

*Primary Examiner*—James C. Cannon
*Attorney, Agent, or Firm*—Arthur A. Loiselle, Jr.

[57] ABSTRACT

Very tough composites of silicon carbide fibers in silicon nitride matrices, especially reaction bonded silicon nitride matrices, can be made by precoating the fibers with pyrolytic carbon and controlling the nitridation or other process which forms the silicon nitride matrix so that a thickness of at least 5 nanometers of carbon remains in the composite after it is formed. Failure of such composites is non-catastrophic.

7 Claims, 3 Drawing Sheets

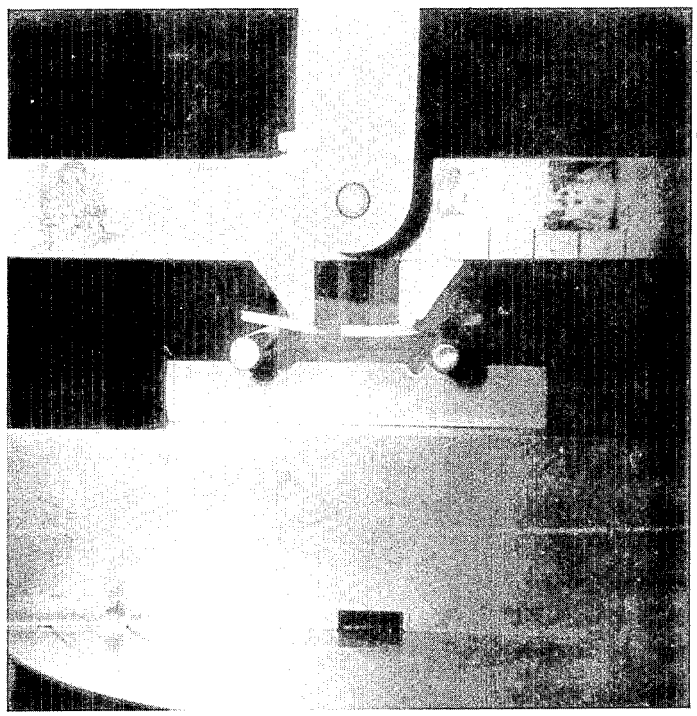
BAR 145.2003-1
@ -4 STRAIN
FIG. 4
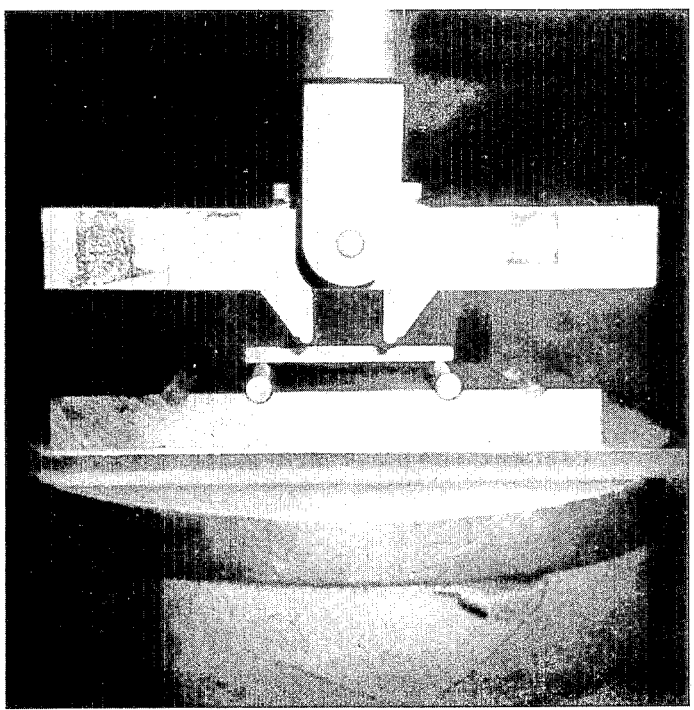
BAR 145.2003-1
LOAD
RELEASED

FIBER-REINFORCED SILICON NITRIDE CERAMICS

CROSS-REFERENCE TO RELATED APPLICATION

This application is a continuation-in-part of copending application Ser. No. 692,441 filed Jan. 17, 1985, and now abandoned.

BACKGROUND OF THE INVENTION

1. Field of the Invention

This invention relates to the field of ceramic composites which comprise a continuous phase, also interchangeably called matrix, and a discontinuous phase, also interchangeably called reinforcement. The discontinuous phase is at least predominantly in the form of elongated fibers. Such materials are generally denoted in the art as fiber reinforced composites. This invention relates more particularly to composites with a matrix comprised predominantly of silicon nitride and reinforcing fibers predominantly of silicon carbide.

2. Technical Background

Like almost all other ceramics, silicon nitride inherently has little ductility, extensibility, or other capacity for stress relief, so that when subjected for even a short time to mechanical stresses in excess of its capacity, it normally breaks. Practical uses for ceramic objects generally expose them to discontinuous and non-uniform mechanical loads, so that the mechanical stress in small areas of the ceramic can easily exceed the capacity of the ceramic even when the overall stress is well below a value which would lead to fracture in laboratory testing. High stresses in small areas cause cracks to form, and because cracks themselves concentrate stress at their tips, a single initial crack can propagate entirely across a ceramic object, causing its catastrophic failure.

Although the term "catastrophic" is often used loosely to describe the failure of materials, for purpose of this application it is useful to give it a more precise definition, with reference to a conventional measurement of the stress induced in a material by mechanical strain. For most materials, including ceramics, the relation between stress and strain is linear at low strains. Increased strain leads eventually to a value, called the yield strain, at which the rate of increase of stress with increasing strain begins to fall below the value it had at very low strains. For typical unreinforced ceramics, the yield strain coincides with fracture of the ceramic, so that the stress falls essentially to zero. Failure of a body is defined as catastrophic for purposes of this application if the stress on the body at a strain 10% higher than the yield strain is less than 20% of the stress on the body at a strain 2% less than the yield strain.

A method well known in general terms in the art for improving the mechanical stability of typically brittle ceramics such as silicon nitride is reinforcing the ceramic with inclusions of other material, often another ceramic. Small ceramic fibers or other particles, because of more nearly perfect crystallinity, are usually stronger and sometimes more shock resistant than bulk bodies, even of the same nominal ceramic composition, which are made by conventional practical processes such as powder sintering or reaction bonding. Reinforcement, of course, need not be limited to particles of the same composition as the matrix, and often it is advantageous to utilize a different composition for some particular property in which it is superior to the matrix.

In some but far from all cases, reinforcement, especially with elongated strong fibers, will prevent catastrophis fracture of a composite, even under conditions expected to cause fracture of the matrix of the composite alone. This improvement in fracture resistance from fiber reinforcement is believed to result primarily from three mechanisms generally recognized in general terms in the prior art: load transfer, crack bridging, and debonding.

Until the recent past, most new types of fiber reinforced composites were made by workers trying to improve strength or rigidity. For such purposes a strong bond between the matrix and the reinforcing fibers is needed, so that strong bonding has usually been a goal. For example, an improvement in modulus of rupture for composites having a silicon nitride matrix formed by sintering was disclosed by Yajima et al. in U.S. Pat. No. 4,158,687. Continuous silicon carbide fibers formed by a special process described in U.S. Pat. No. 4,100,233 were used as the reinforcement, and "polycarbosilane" powder was added to the silicon nitride powder to improve the bonding between the matrix and the fibers. By these means a composite body containing unidirectionally oriented fibers with a modulus of rupture (denominated in this instance as "flexural strength") of 610 MPa was achieved. Good oxidation resistance, corrosion resistance, heat resistance, and strength at high temperatures were asserted as properties of the composites formed, but nothing was stated about the nature of the rupture of the composite.

In fiber reinforced composites with such tight bonding as illustrated by this Yajima patent, cracks resulting from concentrated mechanical stresses in the matrix tend to propagate into the fibers and crack them as well. Recent workers have discovered that such undesirable crack propagation can be avoided by surrounding the reinforcing fibers with a crack deflection zone. The crack deflection zone should have mechanical properties which will cause most cracks which propagate into the zone from the matrix either to be arrested or to follow a path which will keep them away from the reinforcing fibers.

One of the earliest workers to recognize the possible value of coating fibers with weakly bonded coatings appears to have been Warren, as exemplified by EPO Application No. 0 121 797 published Oct. 17, 1984. On page 4 lines 23-25, this application states, "[P]oor fiber to matrix bonds produce tough composites while good fiber to matrix bonds result in brittle, flaw sensitive materials." In the embodiment believed most relevant to the present application, the Warren application teaches forming an array of carbon fibers, coating them while they are in the array with a layer of pyolitic carbon, machining the resulting porous body to the desired final shape, overcoating with a layer of chemically vapor despostied silicon carbide, heating to about 2700° F. "to effect dimensional stability between the silicon carbide/pyolitic carbon and the substrate", and finally overcoating again with a chemically vapor deposited silicon nitride.

Because the carbon fibers which formed the original substrate were arrayed in a fabric, felt, or similar structure before coating, the coating was not uniform around the fibers, as clearly illustrated in FIG. 3 of the Warren application drawings: where two of the original fibers touched in the original array, the coating apparently could not penetrate between them.

The pyrolytic carbon layer deposited according to the teachings of Warren was so weakly bonded that the "fibers were free to move at a different rate from the carbon and/or silicon carbide matrix systems."

Because of its low coefficient of thermal expansion, silicon nitride has long been regarded as one of the most attractive cermaics for use in conditions requiring resistance to thermal stresses. Nevertheless, the low mechanical shock resistance of unreinforced silicon carbide at almost any practical service temperatures and its low creep strength at high temperatures seriously limit its practical uses.

One of the early attempts to improve the properties of silicon nitride by inclusion of other materials in it was disclosed by Parr et al. in U.S. Pat. No. 3,222,438. This taught the inclusion of 5–10% of silicon carbide powder among silicon metal powder which was to be converted to a solid ceramic body by treatment with nitrogen gas at a sufficiently high temperature to promote the conversion of the silicon to its nitride. This process, termed reaction bonding, produced coherent silicon nitride ceramic bodies with creep resistance significantly improved over those made without the silicon carbide powder additions. The bodies to be fired were formed from powders by cold pressing in a die set, and the addition of cetyl alcohol as a binder and lubricant for the powder before pressing was recommended. The disclosure of this patent strongly recommended, and the claims all required, that the reaction bonding temperature exceed 1420° C., the melting point of silicon, during part of the bonding cycle. The modulus of rupture for the composite bodies formed was not given, being described merely as comparing "favourably [sic]with those already published by others".

The use of relatively short silicon carbide fibers for reinforcing ceramics was disclosed by Hough in U.S. Pat. No. 3,462,340. Orientation of the fibers by mechanical or electrostatic forces was taught as an advantage in this patent, but no quantitative information about the mechanical properties of the resulting composites was given. Moreover, the matrix of the composites taguth by this patent was limited to "pyrolitic" materials. The term "pyrolitic" was not particularly clearly defined in the patent specification, but it was apparently restricted to materials having all their chemical constituent elements derived from a gas phase in contact with the hot reinforcing filaments and a mold-like substrate which determined the inner shape of the body to be formed. No method was taught or suggested in the patent for obtaining silicon nitride as a "pyrolitic" product within this definition.

A use of very short fibers of silicon carbide to reinforce ceramic composites having a silicon nitride matrix was taught by Komeya et al. in U.S. Pat. No. 3,833,389. According to the teachings of this patent, the matrix was formed by sintering silicon nitride powder rather than by nitriding silicon metal powder, and the maximum length of the silicon carbide fiber inclusions was 40 microns. A rare earth component was required in the matrix in addition to silicon nitride and the highest modulus of rupture (denominated as "breaking strength") was 375 megapascals (hereinafter MPa). A much more recent publication, P. Shalek et al., "Hot-Pressed SiC Whisker/Si₃N₄ Matrix Composites", 65 *American Ceramic Society Bulletin* 351 (1986), also utilized hot pressed silicon nitride powder with elongated "whiskers" of silicon carbide as reinforcement, but these whiskers still are not more than 0.5 mm in length. Use of silicon carbide whiskers in still other matrices is taught in U.S. Pat. No. 4,543,345 of Sep. 24, 1985 to Wei (alumina, mullite, or boron carbide matrices) and U.S. Pat. No. 4,463,058 of July 31, 1984 to Hood et al. (predominantly metal matrices).

A composite with oriented continuous fiber silicon carbide reinforcement was taguth by Brennan et al. in U.S. Pat. No. 4,324,843. The matrix specified by Brennan was a crystalline ceramic prepared by heating a glassy, non-crystalline powder of the same chemical composition as the matrix desired in the composite. This description of the matrix appears to exclude silicon nitride, which was not taught in the patent as a matrix material. In fact, the broadest claim of this patent requires a matrix of metal aluminosilicates or mixtures thereof. Perhaps for this reason, the highest modulus of rupture noted in this patent for any of its product was less than 100 MPa.

Still another microstructural variation for silicon nitride-silicon carbide composites was disclosed by Hatta et al. in U.S. Pat. No. 4,335,217. According to this teaching, neither fibers nor powder of silicon carbide or silicon nitride is used as an initial constituent of the composite. Instead, a powdery polymer containing both silicon and carbon is mixed with silicon metal powder, pressed, and then heated in a nitrogen atmosphere. The polymer gradually decomposes under heat to yield silicon carbide, while the silicon powder reacts with nitrogen to yield silicon nitride. The composition of the final composite is described as "comprising crystals of beta-silicon carbide, alphasilicon nitride, and beta-silicon nitride ... forming interwoven textures of beta-silicon carbide among said alpha-silicon nitride and beta-silicon nitride crystals without chemical bonding to provide micro gaps . . . for absorption of thermal stresses." The highest reported modulus of rupture for these composites was 265 MPa.

In this Hatta patent there was also a casual reference to "Conventional SiC-Si₃N₄ composite systems . . . fabricated by firing a mixture of silicon powder with . . . SiC fibers in a nitrogen gas atmopshere at a temperature above 1220° C." No further details about how to make such allegedly conventional composites were given in the specification, however.

Much of the non-patent literature in the field of silicon nitride-silicon carbide composites, which in general terms covers the same ground as the patents referenced above, was reviewed by Fischbach et al. in their final report to the Department of Energy under Granst ET-78-G-01-3320 and De-FG-01-78-ET-13389. These investigators found that the types of fibers reported as very successfully used by Yajima in U.S. Pat. No. 4,158,687 were not satisfactory for their bonding because of a tendency for the interior of these fibers to debond from the sheath layer of the fibers during nitridation.

Metal coatings for ceramic reinforcing fibers are taught in U.S. Pat. No. 3,869,335 of Mar. 4, 1975 to Siefert. Such coatings are presumably effective because the ductility of metals allows absorption of the energy of propagating cracks by distortion of the metal. Composites with metal coated fibers are satisfactory for service at relatively low temperatures, but at elevated temperatures the metal coatings can melt and thereby seriously weaken the composite. The matrices taught by Siefert were glasses, which have lower temperature service capability than ceramics. Thus for ceramics, temperature limitation is a serious disadvantage for metal coatings on the reinforcement.

U.S. application Ser. No. 700,246, now U.S. Pat. No. 4,642,271, filed Feb. 11, 1985 by Rice teaches the use of boron nitride as a coating for ceramic fibers to produce a crack deflection zone when the coated fibers are incorporated into composites. Silicon carbide, alumina, and graphite fibers and silica, silicon carbide, cordierite, mullite, and zirconia matrices are specifically taught. Results were highly variable. The toughness of composites of silicon carbide fibers in silica matrices was dramatically increased by a coating of about 0.1 micron of boron nitride, but the same type of coated fibers in zirconia or cordierite produced little improvement in composite toughness compared with composites of uncoated fibers.

A reason for the effectiveness of boron nitride was suggested, and there was additional relevant information, in European Patent Application No. 0 172 082 by Societe Europeenne de Propulsion, published Feb. 19, 1986. This teaches that boron nitride coated onto fibers by gas phase reactions between boron and nitrogen containing gases, as well as carbon coatings produced by certain kinds of pyrolysis, is deposited on fibers in laminar form, with relatively weak bonds between laminae. Thus a crack which enters the coating will normally have its direction of propagation changed if necessary so that the crack will propagate along an interface between laminae of the coating. These interfaces are parallel to the fiber surface, so that the crack is usually prevented from entering the fiber. Carbon and silicon carbide fibers in silicon carbide matrices are specifically taught by this application, and other matrices, such as alumina formed by decomposition of aluminum butylate, are suggested.

The advantages of a crack deflection zone around reinforcing fibers in a different matrix is illustrated by John J. Brennan, "Interfacial Characterization of Glass and Glass-Ceramic Matrix/NICALON SiC Fiber Composites", a paper presented at the Conference on Tailoring Multiphase and Composite Ceramics, held at Pennsylvania State University, July 17–19, 1985. This teaches that certain processing conditions lead to composites in which a carbon rich layer forms around SiC reinforcing fibers, and the carbon rich layer acts as a crack deflection zone. Similarly, advantages for boron nitride coatings on reinforcing fibers are taught by B. Bender et al., "Effect of Fiber Coatings and Composite Processing on Properties of Zirconia-Based Matrix SiC Fiber Composites", 65 *American Ceramic Society Bulletin* 363 (1986). As expected from the titles of these reports, silicon nitride is not taught as a matrix by either of them.

J. W. Lucek et al., "Stability of Continuous SiC(-O) Reinforcing Elements in Reaction Bonded Silicon Nitride Process Environments", *Metal Matrix, Carbon, and Ceramic Matrix Composites*, NASA Conference Publication #2406, p. 27–38 (1985), described silicon nitride matrices reinforced with silicon carbide fibers about 10–25 microns in diameter. These SiC fibers were derived from organo-silicon polymer starting materials. High strength, non-brittle composites were not achieved with these silicon carbide fibers. Lucek at al. reported, on the basis of information supplied by others, that some of the fibers they used had been precoated with boron nitride. Whether the fibers actually were coated has been subjected to some doubt since the original report. Lucek et al., because of government security restrictions imposed on them as a condition of the supply of the allegedly coated fibers, did not attempt to characterize the composites they had prepared to a sufficient extent to determine whether boron nitride, or any other material, actually was present around the polymer derived (PD) silicon carbide fibers they used after their composites had been made with the allegedly coated fibers.

The PD SiC fibers are known to be subject to some recrystallization, with accompanying volume shrinkage, and to partial volatilization, probably preceded by chemical reaction to give volatile products, upon heating in the temperature range required for formation of RBSN. In contrast, chemically vapor deposited (CVD) silicon carbide fibers, also briefly studied by Lucek et al., are much less subject to change in mechanical properties with temperature.

Lucek et al. determined that the tensile strength of their allegedly boron nitride-coated PD SiC fibers were degraded substantially less by exposure of the fibers to the temperature and atmosphere of nitriding than was the tensile strength of similar uncoated fibers. Nevertheless, they further determined, by flexural testing of composites made with various SiC fibers, that (1) the strengths of RBSN composites reinforced with both types of PD SiC fibers were substantially less than those of composites reinforced with CVD SiC fibers, (2) the strength of such composites made with the allegedly coated PD fibers was even less than that of similar composites with uncoated PD fibers, and (3) the tnesile failure of the composites with both types of PD fibers was essentially catastrophic. Presumably some unascertained part of the process of making the fibers into composites destroyed and/or changed the properties of whatever coating was on them, so that when bonded into the RBSN matrix, the coating no longer functioned effectively for crack deflection.

At present, both CVD and PD siilcon carbide fibers are very expensive, but it is believed that if significant volume demand developed, PD fibers could be made at much lower costs than CVD ones. There are also fundamental advantages to the smaller diameter of the PD fibers: smaller fibers are more flexible and versatile, especially in reinforcing complex shapes which require strength in more than one direction and which have thin sections. It is practically difficult to arrange a single thickness of fibers in a plane in an array which will give substantially isotropic reinforcement. It is therefore more common to use fibers within a single layer in nearly parallel array and to superimpose layers of such fibers with different orientations in order to obtain substantially isotropic mechanical properties. Obviously, if an object with a thickness little more than that of one layer of CVD fibers is desired, such an arrangement is impossible with such fibers, but it could be accomplished with the PD fibers, which can be obtained with less than one tenth the diameter of the CVD fibers. The smaller and more flexible PD fibers also can more easily be accommodated in sharp curves of the desired composite. On the other hand, the fundamentally greater thermal stability of the CVD type fibers should make their use safer in composites intended for sustained high temperature service.

For these reasons, it is advantages to provide strong, tough RBSN composites with PD or other small diameter SiC fiber reinforcements as well as with larger fiber reinforcements, and composites of both types made be made according to this invention.

One generalization which appears clear from the background information recited above is that the properties of composites of silicon nitride and silicon carbide, like those of composites generally, are very sensitive to the details of microstructure of the composite. (A similar conclusion was stated in the Fischbach reference already cited.) Microstructural details in turn are sensitive to the chemical and physical characteristics of the starting materials and the processes used to convert the starting materials into a coherent composite body. Little predictability about the mechanical toughness of new and different composite microstructures has been possible heretofore.

SUMMARY OF THE INVENTION

Silicon carbide fibers at least one millimeter in length can be used more advantageously than short fibers to reinforce composites with a silicon nitride matrix, especially one formed by reaction bonding. The terms "silicon carbide fibers" or "SiC fibers" or grammatical variations of these terms should be understood for the purpsoes of this application to include any material in fibrous form with at leats 55% of its constituent atoms comprised of silicon and carbon. This fibers already described above, which are known to be specifically includes the PD type of amorphous under some conditions and to include substantial amounts of oxygen and nitrogen atoms, and fibers with a core of some other material such as carbon.

Large diameter silicon fibers, at least as large as 140 microns in diameter, can be used with results at least equal to those obtained with smaller diameter fibers. Some of the composites have a modulus of rupture over 550 MPa, a Young's modulus at strains below 300 MPa of at least 375 GPa, and a non-catastrophic failure mode under mechanical stress. The moduli of the products are particularly high if substantial regions of the composite produced contain long fibers that are substantially straight and mutually parallel, with an orientation transverse to the direction(s) of the greatest strain(s) exerted on the composite during its service life.

At a minimum, the strength and number of the individual fibers in the matrix should be high enough so that the fibers collectively are capable of bearing the load on the composite after matrix failure. Thus if necessary a complete load transfer from the matrix to the fibers can occur without mechanical failure due to tensile overloading. In mathematical terms, if $l_c$ is the maximum load which the composite can sustain without matrix failure, $v_f$ is the fraction of fiber area in a cross section of the composite transverse to application of force, and $t_f$ is the tensile strength per unit area of the fibers, then $l_c/v_f$ should be less than or equal to $t_f$. For safety it is preferable that $l_c/v_f$ should be substantially less than $t_f$. As is apparent from the relation given above, if the total strength of the composite is increased and fibers of the same tensile strength are used, the fiber fraction may need to be increased to meet this criterion. For example, if the total composite has a matrix failure in tension at 552 MPa and the fiber fraction is only 30%, a fiber tensile strength of at least 1.84 GPa is needed. If the fiber fraction is raised to 60%, fibers with tensile strength of 0.94 GPa would be adequate. The fraction of fibers will normally be between 20 and 80% by volume in the composites.

The resistance of the composites of this invention to catastrophic failure can be made particularly high by assuring the presence in the final composite of crack deflection zones surrounding substantially all the reinforcing fibers. A crack deflection zone is a region with significantly different mechanical properties from either the matrix or the reinforcing fibers. In general crack deflection occurs most effectively in materials with some potential new surfaces that can be formed with smaller inputs of energy than are required to form other possible new surfaces by fracturing the material of the deflection zone. Surfaces that require such relatively low energy to form can result from surface energy anisotropy within crystals, grain boundaries in polycrystalline materials, or other similar phenomena.

The crack deflection zone will often differ in chemical composition from both the reinforcing fibers and the matrix, but a difference in morphology could also be sufficient. A highly preferred characteristic of a crack deflection zone is the presence of at least one favored slippage surface running approximately parallel with the surfaces of the reinforcing fibers. The favored slippage surface may be, and often is, at or near the interface of the crack deflection zone with either the fibers or the matrix, as a result of such phenomena as compositional changes at the interface, thermal expansion coefficient mismatches, or morphological differences. Such an interfacial slippage surface is considered to be part of the crack deflection zone for purposes of this application.

Examples of appropriate deflection zone materials include carbon that is chemically vapor deposited (also called pyrolytic carbon), boron nitride, and polytypes 2H(d), 27R, 16 H, 21R, 12H, and 32H of the aluminum-nitrogen-silicon-oxygen system. Pyrolytic carbon is particularly preferred.

BRIEF DESCRIPTION OF THE DRAWINGS

FIG. 4 illustrates the superior strain-bearing capability of one of the composites of this invention.

DESCRIPTION OF THE PREFERRED EMBODIMENTS

Reinforcing Fibers

Figure 1:
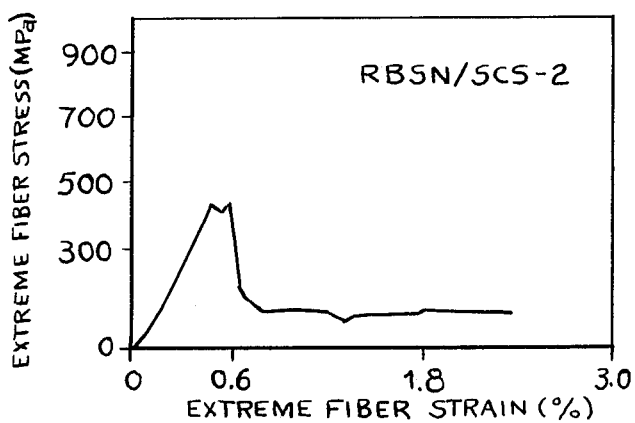
FIGS. 1–3 compare the stress-strain diagrams ror composites of conventional reaction bonded silicon nitride and for two fiber reinforced composites according to this invention.

Two effectives type of silicon carbide fibers for making composites according to this invention are SCS-6 and SCS-2 grades from AVCO Specialty Materials, Lowell, Massachusetts, with a diameter of about 140 microns. Further details about these fibers are given in Example 1. Fibers with similar characteristics may be available from others. It is believed that these type of fibers gives better results than PD ones, when the nitridation cycle is long, because the fibers have more temperature stable strength, relatively low reactivity of the outer surface of the fiber with the matrix, and a relatively thick carbonaceous coating on the fibers. This coating, especially on SCS-6 and similar grades from other suppliers, is thick enough for a substantial amount of it to survive even long nitridation cycles at less than atmospheric pressure, so that it can function effectively as a crack deflection zone around the fibers in final composites prepared with such long reaction bonding.

In light of past experience with ceramic composites, it is surprising that fibers with such a large diameter as 140 microns do not appear to act as strength-limiting flaws in the composite structure, particularly when high volume loadings of such fibers are used. This is especially surprising in view of the substantial difference in thermal expansion coefficients between the fibers and the matrix. Also surprising is that thorough densification of the matrix is not always necessary to achieve desirable composite properties, although as with other composites, relatively high densification of the matrix is preferable.

When thinner or potentially less costly fibers are desirable for any of the reasons already noted, only PD silicon carbide fibers are now readily available. These are commercially available from AVCO (noted above), Dow Corning, UBE Ltd. of Japan, and Nippon Carbon Ltd., Tokyo, Japan. These fibers have diameters between 10 and 20 microns.

Crack Deflection Zones

Crack deflection zones are preferably provided by coating the reinforcing fibers with pyrolytic carbon, according to a process taught by J. V. Marzik, "CVD Fibers", *Proceedings of the Metal and Ceramic Matrix Comference Processing Conference*, Vol. II, p. 39–65 (Conference held at Battelle's Columbus Laboratories from 13–35 Nov. 1984). An initial coating thickness of at least 1 micron is normally preferred, but the most important characteristic of the coating is its crack deflection ability after processing, not the initial coating thickness.

Green Body Assembly, Debinderizing, and Sintering

The placement of fibers within the shape of the desired final composite may be accomplished by any means conventional in the art. When the final product is expected to be subject to stresses in use primarily along a single direction, the fibers should be arranged as much as practicable transverse to that direction, so that the expected stress will have to bend the fibers in order to distort the body they are reinforcing. For applications with stresses applied in various directions, it may be advantageous to use several layers, with parallel orientation of fibers within each layer, but different directions between layers. In many cases, however, it will be adequate to utilize the fiber in lengths of as little as one millimeter with relatively random orientation.

Many final product structures can be effectively assembled from thin flat "tapes" containing oriented fibers. To make such tapes, a sufficient number of fibers or fiber tows to cover the desired width are supported by any appropriate mechanical means in a monolayer with the fibers substantially straight and coparallel. This fiber array is supported in some appropriate fashion so that it can be coated with a slurry of silicon powder and at least one polymeric binder in a suitable solvent.

The preferred silicon powder was a technical grade, nominally 99% pure, with a mean particle size of about 3 microns. (A suitable material was obtained from Elkem Metals Co., Marietta, Ohio.). Although many polymeric materials, natural or synthetic, such as polyvinyl acetate, vegetable gums, etc. could be used as the polymeric binder, the preferred one was a plasticized poly(vinyl butyral), marketed as Butvar 891 by Monsanto Chemical Co., Springfield, Mass. About 33 parts by weight of silicon, 12 parts by weight of polymer (including plasticizer), and 55 parts by weight of suitable solvent such as alcohol are mixed together. The mixture is coated by any appropriate means, such as hand application, spraying, painting, a curtain coater, etc. over the prepared array of silicon carbide fibers to a sufficient depth so as to cover the fibers after drying. The combination of fibers and slurry is dried at about 20° C. for about 2 hours in the ambient atmosphere, resulting in a flexible coherent tape from which the solvent has been substantially expelled.

The tapes thus prepared may be laid up by conventional means to fit any desired final shape. To make samples of composites for testing, suitable lengths of the tape thus made were cut, stacked one atop another while preserving a common direction of orientation of the fibers within the cut lengths of tape, and mechanically pressed perpendicular to the planes of the tape segments in the stack, preferably under a pressure of at least 0.4 but not more than 0.7 Megapascals and at a temperature of about 100° C. In a typical example, compressed blocks fifty millimeters in both width and length and 6–8 mm in thickness were thus prepared.

The compressed blocks, or other bodies of any shape, are then treated to remove the polymer binder constituent in the bodies. Preferably, this is accomplished by heating the bodies in an inert gas atmosphere at a rate of temperature increase of about 1250° C. per hour to a final temperature of about 1250° C., holding at that temperature for about fifteen minutes, and cooling by natural convection at a rate estimated to be between 100° and 200° C. per hour. During the heating process, the flow rate of inert gas should be maintained at a sufficient volume to sweep away any significant gaseous decomposition products formed, and the bodies should be maintained under pressure. By this process the original content of polymer binder is almost totally removed from the bodies, but because of sintering of the silicon powder particles, the bodies remain coherent.

Nitriding

The debinderized bodies are converted to their final ceramic form by heating the bodies in an atmosphere of nitrogen gas with chemical purity of at least 99.998%. Preferably, the nitriding is continued long enough to convert substantially all the elemental silicon in the body to silicon nitride. Because silicon has a much lower melting point than silicon nitride, substantial residual elemental silicon can limit high temperature serviceability of the final composites. Complete absence of silicon in an X ray diffraction analysis, which could detect as little as 1 atomic percent, is preferred.

In the long established process of forming reaction bonded silicon nitride (RBSN) without reinforcement, it has become customary to use a lengthy nitridation cycle to maximize the amount of the alpha crystal form of silicon nitride in the final product. Crystals of the alpha form were believed to form a stronger product than those of the beta form, which predominate in products prepared at higher nitrogen gas pressure and correspondingly shorter times.

The so-called "rate limited" nitridation process used to maximize the amount of alpha $Si_3N_4$ in unreinforced RBSN can be effectively used for making products according to this invention, if silicon carbide fibers with adequate stability are used. AVCO SCS-6 fibers, for example, will make effective composites according to this invention with a "rate limited" nitridation process. This type of nitridation is normally done in a cold-wall vacuum furnace. The debinderized composite samples are initially heated in vacuo to a temperature of about 1100° C. Nitrogen gas is then admitted to the furnace chamber until the total furnace pressure is slightly less than one atmosphere. The temperature is then increased, initially at a rate of about 100° C. per hour. As the temperature rises, nitriding proceeds at a faster rate and begins to cause the pressure in the furnace to fall as nitrogen is coverted to non-volatile silicon nitride. The pressure drop is monitored by a sensor and a solenoid valve controlled by the sensor allows additional nitrogen gas into the furnace only to the extent necessary to maintain the pressure between 0.3 and 0.7 atmospheres. When consumption of nitrogen is rapid, the temperature increase rate is greatly reduced, so that substantially complete reaction normally requires 30–48 hours. The final temperature should be limited to a maximum of 1380° C., below the melting point of silicon.

After completion of the nitriding treatment, the composite ceramic bodies are preferably cooled at a rate of not greater than 200° C. per hour. The final result is a ceramic body resistant to thermal and mechanical shocks and suitable for long term service at temperatures up to about 1200° C., at least in non-oxidizing atmospheres. These composites contain 20–50 volume percent silicon carbide filaments, and the density of the silicon nitride matrix component of the composites is believed to be about 1.8–2.0 gm/cm$^3$.

The superiority of the ceramic composites made with CVD SiC fibers according to this invention over conventional prior art composites is exemplified by the results of conventional laboratory testing in a four point or three point bend test geometry. (The four point test was performed with a 25 mm lower span and a 12 mm upper span; the three point test was performed with an 8:1 lower span to specimen depth ratio and a constant displacement rate of $8.5 \times 10^{-4}$ mm/sec.) The test specimens exhibited an elastic deformation range in bending up to as much as 700 MPa, with Young's moduli of 380–420 GPa through this range of strains. The average modulus of rupture of several specimens was 580 MPa, substantially above those of most prior reports. Finally, the mechanism of initial failure of elasticity was non-catastrophic. With all prior art SiC reinforced RBSN composites known to the applicants, the first reduction of load-bearing capacity under stress usually results in complete rupture, with obvious adverse consequences for the integrity of any structure composed of such materials.

The scope and variety of the invention can be further appreciated from the following examples.

EXAMPLE 1

For this example, the silicon carbide fibers used were obtained from AVCO Specialty Materials, Lowell, Massachusetts. The fibers consist primarily of a sheath about sixty microns thick of chemically vapor deposited silicon carbide on a filamentous carbon substrate fiber with diameter of about twenty microns. The SiC sheaths of these fibers have thermal, chemical, and mechanical properties that more closely approximate those of bulk stoichiometric silicon carbide than do PD silicon carbide fibers. The outer surface of these fibers is then coated predominantly with pyrolytic carbon; the coating probably also includes some silicon carbide. Two types of fibers, designated SCS-6 and SCS-2, were used for this example. The major difference between these two types is the thickness of the carbon coating applied: about 1 micron for SCS-2 and 3 microns for SCS-6.

Fibers were cut into 60 mm lengths and arranged on a polyethylene film backing strip in a single layer with each fiber straight and touching its neighboring fiber(s) along essentially its entire length. Thus the fibers were substantially parallel and aligned in the same direction. The total width of the fiber array formed was about 60 mm. The fiber ends were secured to the polyethylene strip at their ends to maintain fiber alignment during coating and other processing.

A slurry coating material was prepared, having the following composition in parts by weight:

| | |
|---|---|
| 2-Propanol | 49 parts |
| Poly(vinyl butyral) | 6 parts |

The silicon metal powder used had a mean particle size of about 3 microns and about 99% purity, with 0.7% iron as the principal impurity. The slurry was coated with a brush onto the previously prepared array of SiC fibers to a thickness of about 150 microns. The slurry had sufficient viscosity to remain on the fibers. After application of the slurry on the first side, the coated composite was dried at about 20° C. for about two hours. The polyethylene backing then could be removed without disturbing the alignment of the fibers, and after the backing was removed, the side of the array which had originally been against the polyethylene film was coated with the same slurry to a thickness of about ten microns, and again dried by the same conditions as after the first coating. The dried, doubly coated composite was flexible and is called a "tape".

Squares 50 mm on each side were cut from the tape. Approximately eight of these squares were stacked with fiber directions in all squares the same, and the stack was then pressed at room temperature in a steel die at a pressure of about 21 MPa. The polymer bonded composite formed by this first pressing was then transferred to a graphite hot pressing die and compacted further at 1250° C. and about 21 MPa pressure in an atmosphere of flowing argon gas for about fifteen minutes. This second, hot pressing served to sinter the silicon matrix and pyrolize and expel the fugitive organic binder components: poly(vinyl butyral) and butyl benzyl phthalate. The result of this process was a coherent composite with a silicon metal matrix and silicon carbide fibers.

The composite from the second pressing was then reacted over a period of 35 to 40 hours with high purity nitrogen by the rate limited process already described above. As a result of this treatment, the silicon metal matrix was substantially quantitatively converted to silicon nitride, with a 66.5% weight increase and a 22% volume increase. The volume increase, however, is accommodated within the pores of the silicon matrix composite, so that no change in its external dimensions occurs during the transformation into silicon nitride.

The silicon nitride composite was sliced into test samples along two sets of perpendicular planes, each of which was parallel to the direction of the included silicon carbide fibers and the slices were polished to a dimension of 3.18×3.18×50 mm with a grit 320 diamond grinding wheel. Apparent density and predominant crystalline phases were determined on one of these samples and three were subjected to a three point bending flexural strength test as already described. The average of three flexural tests and the other measurements compared with high quality commercial reaction bonded silicon nitride (RBSN) without fiber reinforcement as shown in Table 1 below.

TABLE 1

| MECHANICAL PROPERTIES OF RBSN | | |
|---|---|---|
| | With No Fibers | With Fibers |
| Apparent Density: | 2400 Kg/m$^3$ | 2410 Kg/m$^3$ |
| Maximum Flexural Strength: | 275 MPa | over 600 MPa |
| Failure Mode: | Catastrophic | Non-catastrophic |
| Major Matrix Phases: | alpha and beta Si$_3$N$_4$ | same as at left |

Figure 2:
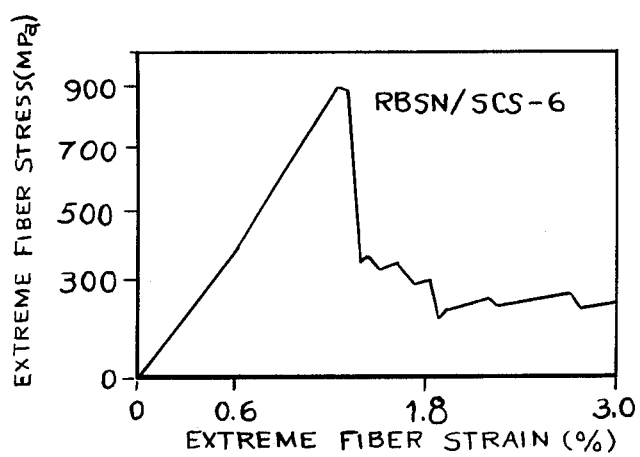
Figure 3:
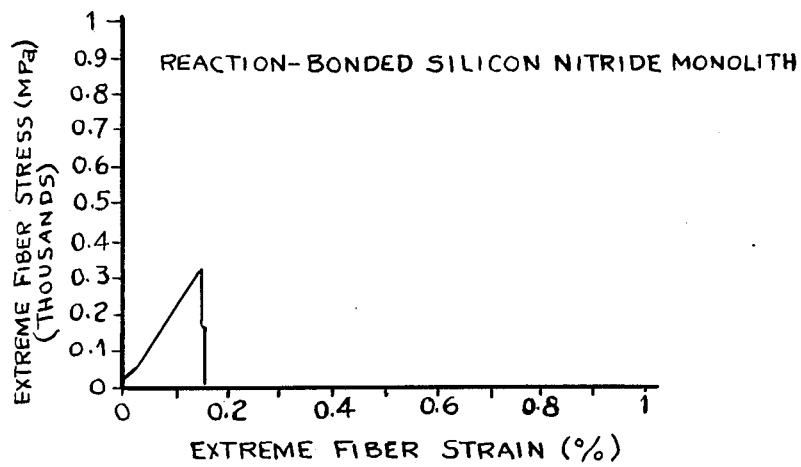

The stress-strain diagrams of the three types are shown in FIGS. 1-3. The presence of the reinforcing fiber leads to a higher strength and increased work of fracture. The composites, unlike monolithic RBSN, can sustain substantial loads after initial matrix failure, as shown by the retention of significant fiber stress after the first declines in such stress with increasing strain. Non-catastrophic failure of a composite produced in this Example is also demonstrated in FIG. 4, which compares photographs of a composite according to this invention during and after severe flexural stress.

The behavior of composites with SCS-2 reinforcement, as shown in FIG. 1, was intermediate between the other two types of composites in this example. At slightly above 0.6% fiber strain, the composite with SCS-2 exhibited substantial although not quite catastrophic failure, while the composite with SCS-6 suffered no failure below 1.1% strain.

Figure 5:
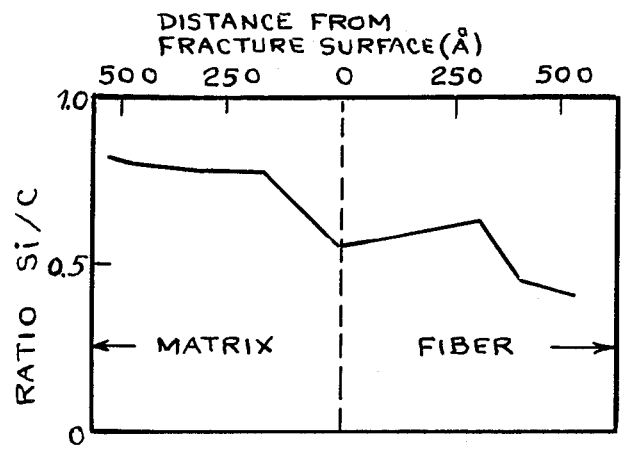
FIG. 5 shows the atomic ratio of silicon to carbon in the vicinity of the fiber-crack deflection zone-matrix interfaces in one typical composite according to this invention.
Figure 6:
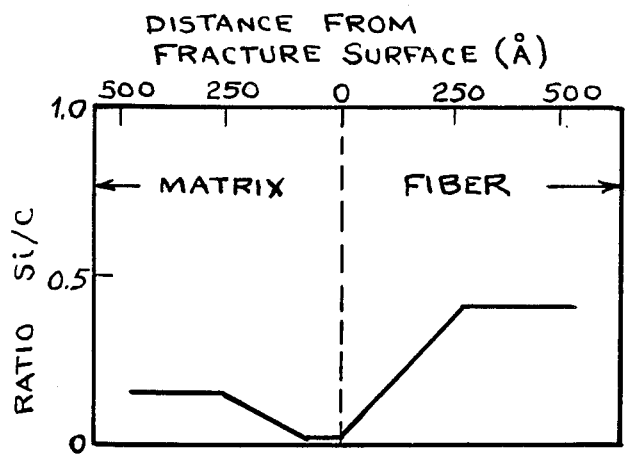

Measurement by Auger analysis of atomic fractions in the fracture zones of the two composites, shown graphically in FIG. 5, established that in the composite with SCS-2, no area of essentially pure carbon remained around the fibers, while there was such a zone in the composite with SCS-6. Apparently the originally thinner layer of carbon in SCS-2 filaments was destroyed or infiltrated by silicon from the matrix during nitridation.

In the composites with SCS-6 reinforcing fiber, delamination during fracture occurred near the edge of the zone of essentially pure carbon present in these composites. This is consistent with the expected effectiveness of this carbon, and/or is interfaces with the major components of the composite, as a crack deflection zone.

EXAMPLE 2

This example was the same as the part of Example 1 which used SCS-6 fibers, except that the second pressing operation of that Example was replaced with uniaxial pressing at 100° C. and about 21 MPa in a steel mold. The density of these composites was 2540 Kg/m$^3$ and the flexural strength more than 875 MPa. The different pressing conditions resulted in composites with higher density and flexural strength but lower tolerance for extension without significant damage.

Various physical property comparisons among the products from Examples 1-2 and unreinforced conventional reaction bonded silicon nitride are shown in Table 2 below. Values shown are averages of two or three specimens. The "failure" specified in the heading of the second column of the table is the point of first decrease in fiber stress with increasing strain. The composite samples never entirely broke, even up to 6% fiber strain, and retained significant fractions of their maximum strength even at such high strains, as shown in the table.

The work of fracture of the composites shown in Table 2 was calculated from the area under the load-displacement curve from the three point bend test already described. The work of fracture is more than an order of magnitude higher for the reinforced samples.

TABLE 2

| PROPERTIES OF COMPOSITES WITH CVD FIBERS | | | | |
|---|---|---|---|---|
| Product from Example Number: | Percent Strain to Failure | Maximum Bending Stress, Gigapascals | Work of Fracture, Joules/ Sq. Cm. | Percent of Maximum Strength Retained at 6% Strain |
| 1(SCS-6) | 3.0$_5$ | 0.64 | 9 | 5$_4$ |
| 1(SCS-2) | 3.$_8$ | 0.9 | 10 | 3$_1$ |
| 2 | 1.9 | 0.48 | 4 | 21 |
| Unreinforced | 0.3 | 0.24 | 0.25 | 0 |

While the examples involve unidirectional filament or fiber arrays, it should be emphasized that this is not a limitation of the invention.

Composites prepared according to this invention are useful for any of the uses now served by silicon nitride, including but not limited to: thermocouple sheaths, riser stalks for low pressure die casting, crucibles, and furnace tapping seals and plugs for foundries for non-ferrous metals, particularly aluminum; degassing tubes and lining plates for primary aluminum smelters; precision jigs and fixtures for soldering, brazing, and heat treatment processes in the manufacture of electronic and semiconductor goods, jewelry, or any other metal or glass object requiring heat treating; wear resistant fixtures for optical devices, nose guides and electrode holders for electrodischarge machining, or guides and templates for electrochemical machining; welding nozzles and insulators; components of pumps, valves, or vessels for handling corrosive chemicals and abrasive mixtures; artificial teeth and dental bridges; and components for engines which can operate at higher temperatures than engines with all metal combustion containment chambers.

Composites with reaction bonded silicon nitride are particularly useful as structural ceramics, because of their combination of light weight with high stiffness and a low coefficient of thermal expansion. This combination of properties is particularly valuable for structures to be used in space, where (1) the absence of oxygen avoids one of the major limitations of RBSN in terrestrial environments, the susceptibility of RBSN to oxidative degradation at high temperatures, (2) the low weight is especially valuable because of the cost of launching weight into space, and (3) a low coefficient of thermal expansion is particularly valuable for structures exposed to sunlight on only one side.

RBSN composites are also useful for electrical applications because of their strength and dielectric properties, and as biological replacement materials, because of corrosion resistance, absence of toxicity, and ability to bond well to animal tissue.

The greater strength and toughness of composite bodies mde according to this invention will make them useful in additional applications now avoided with silicon nitride bodies subject to catastrophic failure.

What is claimed is:

1. A composite, comprising:

(a) from 20–80% by volume of reinforcing silicon carbide ceramic fibers at least one millimeter in average length, said fibers collectively having sufficient tensile strength to bear a load on said composite at the point of matrix failure without fiber tensile failure, (b) a matrix comprising predominantly reaction-bonded silicon nitride, and (c) crack deflection zones, having mechanical properties substantially different from those of both the matrix and the reinforcing fibers of the composite, occupying a predominant portion of the space around the reinforcing fibers, said composite having non-catastrophic failure under mechanical stress and a modulus of rupture of at least 550 MPa, wherein said crack deflection zones are comprised predominantly of a material with its most probable direction of slip under mechanical stress substantially parallel to the surfaces of said reinforcing fibers.

2. A composite as recited in claim 1, wherein said crack deflection zones are 5 nanometers thick and comprised predominantly of a material selected from the group consisting of carbon, boron nitride, and polytypes 2H(d), 27R, 16H, 12H, and 32H of the aluminum-nitrogen-silicon-oxygen system.

3. A composite as recited in claim 1, wherein said crack deflection zones are composed predominantly of laminar-deposited pyrolytic carbon.

4. A composite as recited in claim 1, wherein said reinforcing fibers comprise no more than 55% of the volume of said composite, having a diameter of from 125–150 microns and consist predominantly of chemically vapor-deposited silicon carbide around a carbon core from 10–20 microns in diameter.

5. A composite according to claim 1 having a modulus of rupture of at least 550 megapascals and a Young's modulus at stresses below 300 megapascals of at least 375 gigapascals.

6. A composite according to claim 1, wherein said matrix is predominantly reaction bonded silicon nitride.

7. A composite according to claim 1, wherein said matrix is predominantly reaction bonded silicon nitride.

* * * * *